(12) United States Patent
Hata et al.

(10) Patent No.: US 12,728,880 B2
(45) Date of Patent: Sep. 8, 2026

(54) VEHICLE CONTROL SYSTEM

(71) Applicant: TOYOTA JIDOSHA KABUSHIKI KAISHA, Toyota (JP)

(72) Inventors: Ryosuke Hata, Mishima (JP); Atsushi Kodama, Susono (JP); Toshihiko Seki, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 18/982,034

(22) Filed: Dec. 16, 2024

(65) Prior Publication Data

US 2025/0276710 A1 Sep. 4, 2025

(30) Foreign Application Priority Data

Mar. 1, 2024 (JP) ................................ 2024-031505

(51) Int. Cl.

| | |
|---|---|
| ***B60Q 1/00*** | (2006.01) |
| ***B60W 50/00*** | (2006.01) |
| ***B60W 50/14*** | (2020.01) |
| ***B60W 60/00*** | (2020.01) |

(52) U.S. Cl.

CPC ........ *B60W 50/14* (2013.01); *B60W 50/0097* (2013.01); *B60W 60/001* (2020.02); *B60W 2050/146* (2013.01)

(58) Field of Classification Search

CPC ............. B60W 50/14; B60W 50/0097; B60W 60/001; B60W 2050/146; B60W 60/0011; B60K 2360/167; B60K 2360/175; B60K 35/22; B60K 35/26

USPC ...................................................... 340/425.5

See application file for complete search history.

(56) References Cited

U.S. PATENT DOCUMENTS

| | | | | |
|---|---|---|---|---|
| 9,964,950 | B2 | 5/2018 | Takano | |
| 10,017,116 | B2 | 7/2018 | Sato | |
| 10,310,508 | B2 | 6/2019 | Kunisa et al. | |
| 10,452,930 | B2 | 10/2019 | Sato | |
| 10,663,973 | B2 | 5/2020 | Hashimoto et al. | |
| 10,895,875 | B2 | 1/2021 | Hashimoto et al. | |
| 11,001,198 | B2 | 5/2021 | Morimura et al. | |
| 11,275,382 | B2 | 3/2022 | Hashimoto et al. | |
| 11,821,750 | B2 * | 11/2023 | Kitahara | B60W 60/001 |
| 2018/0009438 | A1 * | 1/2018 | Masui | B60W 30/16 |
| 2018/0194349 | A1 * | 7/2018 | McGill, Jr. | B60W 60/0013 |
| 2019/0135279 | A1 * | 5/2019 | Irie | B60W 30/12 |
| 2019/0197902 | A1 * | 6/2019 | Shin | G08G 1/166 |
| 2019/0241198 | A1 * | 8/2019 | Mori | G08G 1/16 |

(Continued)

FOREIGN PATENT DOCUMENTS

JP 2023-023538 A 2/2023

*Primary Examiner* — Tai T Nguyen

(74) *Attorney, Agent, or Firm* — SoraIP, Inc.

(57) ABSTRACT

The vehicle control system generates a target trajectory based on the driving environment of the vehicle, and performs vehicle travel control for controlling the vehicle to follow the target trajectory. The vehicle control system calculates a predicted trajectory or a degree of deviation between the predicted vehicle state and the target trajectory predicted from the current vehicle state of the vehicle. When the degree of deviation satisfies the notification providing condition, the vehicle control system provides a notification indicating a target behavior of the vehicle caused by the vehicle travel control to the occupant of the vehicle.

4 Claims, 6 Drawing Sheets

(56) References Cited

U.S. PATENT DOCUMENTS

| | | | | |
|---|---|---|---|---|
| 2021/0107522 | A1* | 4/2021 | Goto | B60W 60/0011 |
| 2021/0229598 | A1 | 7/2021 | Morimura et al. | |
| 2021/0300419 | A1* | 9/2021 | Matsunaga | B60W 60/0018 |
| 2021/0380124 | A1 | 12/2021 | Urano et al. | |
| 2022/0266871 | A1* | 8/2022 | Hayashi | B60W 60/00272 |
| 2024/0294185 | A1* | 9/2024 | Sato | B60W 60/001 |

* cited by examiner

VEHICLE CONTROL SYSTEM

CROSS-REFERENCE TO RELATED APPLICATION

This application claims priority to Japanese Patent Application No. 2024-031505 filed on Mar. 1, 2024, incorporated herein by reference in its entirety.

BACKGROUND

1. Technical Field

The present disclosure relates to a technique for providing a notification indicating a target behavior of a vehicle under travel control to an occupant of the vehicle.

2. Description of Related Art

Japanese Unexamined Patent Application Publication No. 2023-023538 (JP 2023-023538 A) discloses a technique for providing in advance information as to whether a target vehicle can travel on a target travel path in a predetermined travel pattern.

SUMMARY

It is herein assumed that an occupant is in a vehicle under vehicle travel control. When a vehicle behavior is caused by the vehicle travel control and the occupant was unable to anticipate that behavior, the occupant may feel uncomfortable or uneasy.

One object of the present disclosure is to reduce an uncomfortable or uneasy feeling of an occupant when a vehicle behavior the occupant is unable to anticipate is caused by vehicle travel control.

A first aspect relates to a vehicle control system that controls a vehicle.

The vehicle control system includes a control device.

The control device is configured to perform vehicle travel control for generating a target trajectory based on a driving environment of the vehicle and controlling the vehicle in such a manner that the vehicle follows the target trajectory.

The control device is configured to calculate a degree of deviation between a predicted trajectory or a predicted vehicle state and the target trajectory, the predicted trajectory or the predicted vehicle state being predicted from a current vehicle state of the vehicle. The control device is configured to, when the degree of deviation satisfies a notification providing condition, provide a notification indicating a target behavior of the vehicle due to the vehicle travel control to an occupant of the vehicle.

According to the first aspect, the vehicle control system provides a notification indicating the target behavior of the vehicle to the occupant according to the degree of deviation between the predicted trajectory or the predicted vehicle state and the target trajectory. This allows the occupant to know how the vehicle will behave. Accordingly, an uncomfortable or unease feeling about the behavior of the vehicle due to the vehicle travel control is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings.

1. Advanced Vehicle Control System

Figure 1:
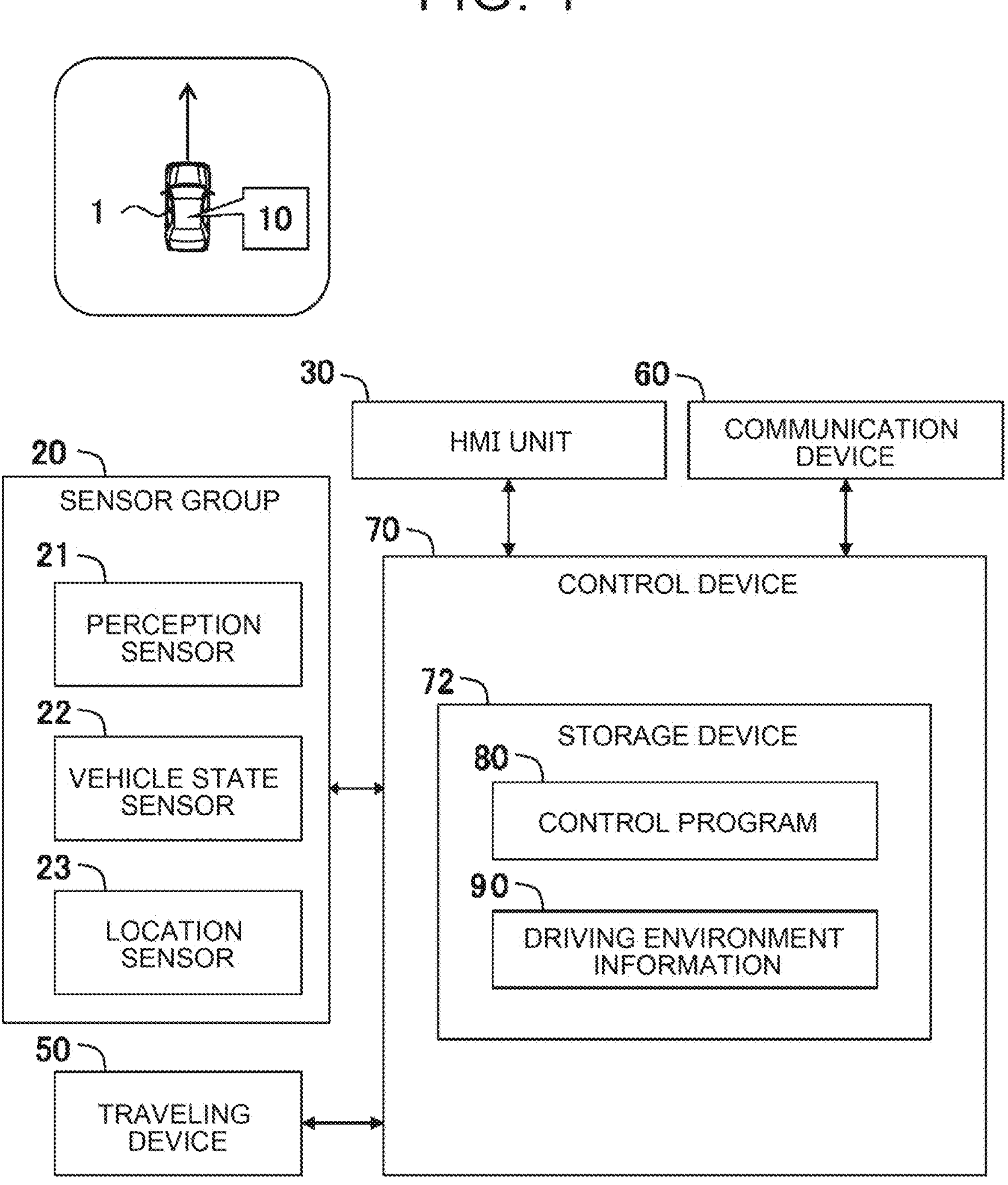
FIG. 1 is a conceptual diagram for explaining an outline of a vehicle control system according to the present embodiment.

FIG. 1 is a conceptual diagram for explaining an outline of a vehicle control system 10 according to the present embodiment. The vehicle control system 10 controls the vehicle 1. Typically, the vehicle control system 10 is mounted on the vehicle 1.

The vehicle control system 10 includes a sensor group 20, an HMI (Human Machine Interface) unit 30, a traveling device 50, a communication device 60, and a control device 70. At least the sensor group 20, HMI unit 30, the traveling device 50, and the communication device 60 are mounted on the vehicle 1. The sensor group 20 includes a recognition sensor 21, a vehicle state sensor 22, and a position sensor 23.

The recognition sensor 21 recognizes (detects) a situation around the vehicle 1. Examples of the recognition sensor 21 include a camera, a LIDAR (Laser Imaging Detection and Ranging), a radar, and the like. The vehicle state sensor 22 detects the state of the vehicle 1. For example, the vehicle state sensor 22 includes a speed sensor, an acceleration sensor, a yaw rate sensor, a steering angle sensor, and the like. The position sensor 23 detects the position and the azimuth of the vehicle 1. For example, the position sensor 23 includes a GNSS (Global Navigation Satellite System).

HMI unit 30 is an interface for providing information to an occupant (e.g., a driver) of the vehicle 1 and receiving information from the occupant. Specifically, HMI unit 30 includes an inputting device and an outputting device. Examples of the input device include a touch panel, a switch, and a microphone. Examples of the output device include a display device, a speaker, and the like. Examples of the display device include a liquid crystal panel and an organic EL panel.

The traveling device 50 (actuator) includes a steering device, a driving device, and a braking device. The steering device will turn the wheel. For example, the steering device includes a power steering (EPS: Electric Power Steering) device. The driving device is a power source that generates a driving force. Examples of the driving device include an engine, an electric motor, and an in-wheel motor. The braking device generates a braking force.

The communication device 60 communicates with the outside via a communication network. Examples of the communication scheme include mobile communication such as 5G, and radio LAN.

The control device 70 is a computer that controls the vehicle 1. Typically, the control device 70 is mounted on the vehicle 1. However, a part of the control device 70 may be disposed in an external device, and the vehicle 1 may be controlled remotely. The control device 70 performs various processes. For example, the control device 70 includes processing circuitry such as a CPU (Central Processing Unit). The processing circuit may also be referred to as a processor. The control device 70 includes one or more storage devices 72 (hereinafter simply referred to as storage devices 72). The storage device 72 stores various types of information. Examples of the storage device 72 include volatile memory, nonvolatile memory, HDD (Hard Disk Drive), SSD (Solid State Drive), and the like.

The control program 80 is a computer program for controlling the vehicle 1. The function of the control device 70 may be realized by cooperation of the control device 70 that executes the control program 80 and the storage device 72. The control program 80 is stored in the storage device 72. Alternatively, the control program 80 may be recorded in a computer-readable recording medium.

The control device 70 acquires the driving environment information 90 indicating the driving environment of the vehicle 1. The driving environment information 90 is stored in the storage device 72.

Figure 2:
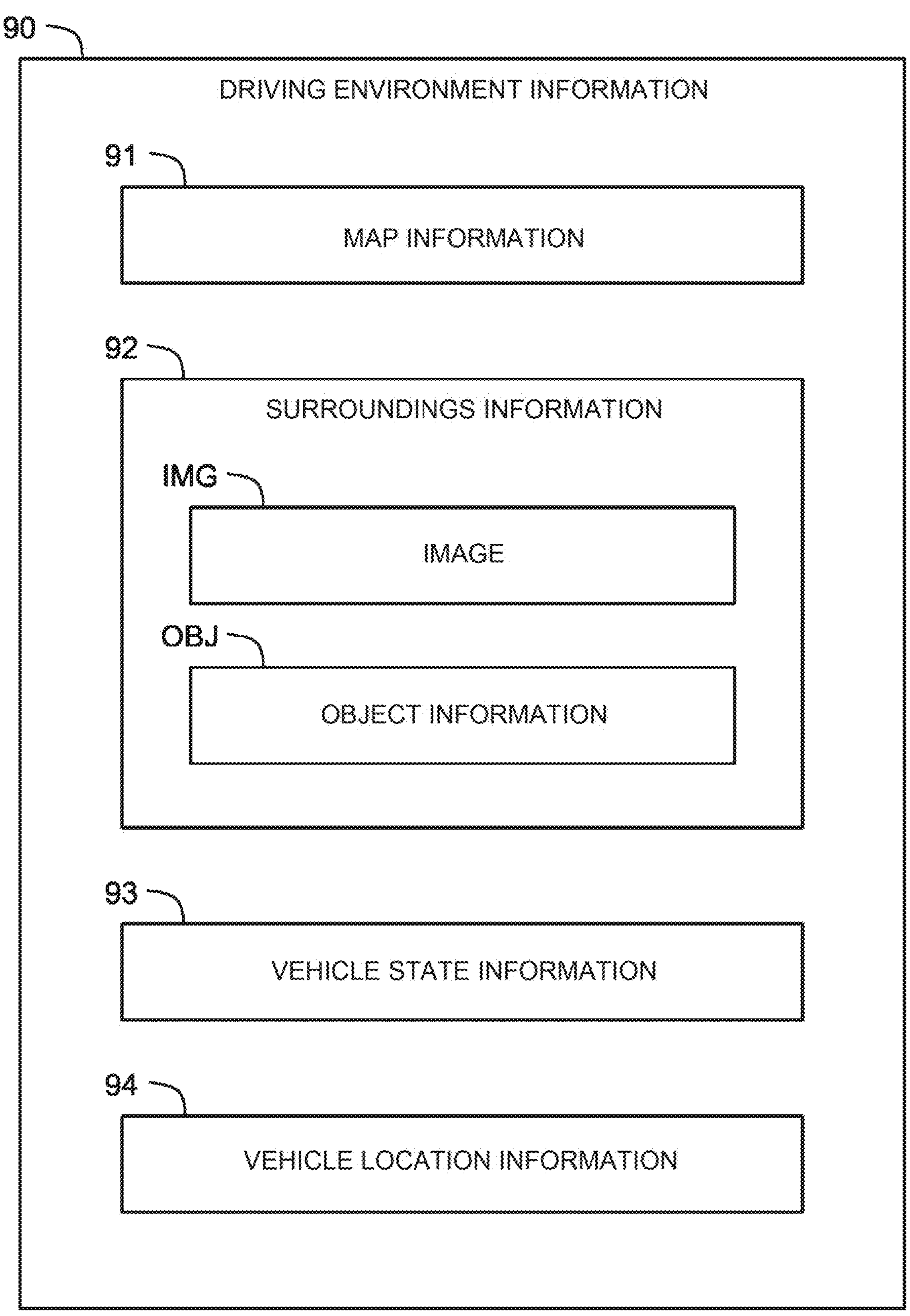
FIG. 2 is a block diagram illustrating an example of driving environment information.

FIG. 2 is a block diagram illustrating an example of the driving environment information 90. The driving environment information 90 includes map information 91, surroundings information 92, vehicle state information 93, and vehicle location information 94.

The map information 91 includes a general navigation map. The map information 91 may indicate a lane arrangement or a road shape. The map information 91 may include positional information such as a structure, a traffic light, a sign, and the like. The control device 70 acquires map information 91 of a necessary area from the map database. The map database may be stored in the storage device 72 or may be stored in a map management device outside the vehicle 1. In the latter case, the control device 70 communicates with the map management device via the communication device 60, and acquires necessary map information 91.

The surroundings information 92 is information obtained based on a recognition result by the recognition sensor 21, and indicates a situation around the vehicle 1. The control device 70 recognizes a situation around the vehicle 1 using the recognition sensor 21, and acquires the surroundings information 92. For example, the surroundings information 92 includes image IMG captured by the camera. Alternatively, the surroundings information 92 includes point cloud information obtained by LIDAR.

The surroundings information 92 further includes object information OBJ related to objects (targets) around the vehicle 1. Examples of the object include pedestrians, bicycles, motorcycles, other vehicles (preceding vehicles, parked vehicles, and the like), white lines, traffic lights, structures (e.g., poles, pedestrian bridges), signs, obstacles, and the like. The object information OBJ indicates the relative position and the relative velocity of the object with respect to the vehicle 1. For example, an object can be identified and the relative position of the object can be calculated by analyzing the image IMG obtained by the camera. It is also possible to identify an object based on the point cloud data obtained by LIDAR, and to acquire the relative position and the relative velocity of the object. The control device 70 may track the recognized object. The object information OBJ then also includes the trajectory information of the recognized object.

The vehicle state information 93 is information detected by the vehicle state sensor 22 and indicates the state of the vehicle 1. The state of the vehicle 1 includes vehicle speed, acceleration, yaw rate, steering angle, and the like. The control device 70 acquires the vehicle state information 93 from the vehicle state sensor 22. The vehicle state information 93 may indicate a driving state (automatic driving/manual driving) of the vehicle 1.

The vehicle location information 94 is information indicating the current position of the vehicle 1. The control device 70 acquires the vehicle location information 94 from the detection result by the position sensor 23. Further, the control device 70 may acquire the highly accurate vehicle location information 94 by a well-known self-position estimation process (Localization) using the object information OBJ and the map information 91.

Further, the control device 70 performs vehicle travel control for controlling the travel of the vehicle 1. The vehicle travel control includes steering control, acceleration control, and deceleration control. The control device 70 performs vehicle travel control by controlling the traveling device 50 (a steering device, a drive device, and a braking device). More specifically, the control device 70 calculates a control amount (actuator control amount) of the traveling device 50, and controls the traveling device 50 in accordance with the actuator control amount.

Further, the control device 70 performs autonomous driving control for controlling autonomous driving of the vehicle 1. Here, the autonomous driving means that at least a part of the steering, acceleration, and deceleration of the vehicle 1 is automatically performed independently of the operation of the occupant. As an example, level 3 or more automated driving may be performed. The control device 70 generates a travel plan of the vehicle 1 based on the driving environment information 90. Examples of the traveling plan include maintaining the current traveling lane, changing lanes, turning right and left, avoiding collision with an object, and the like. More specifically, the travel plan includes a route plan and a speed plan of the vehicle 1. The route plan is a set of target positions of the vehicle 1. The velocity plan is a set of target velocities for each target position. The combination of path planning and velocity planning is also referred to as "target trajectory". That is, the target trajectory includes a target position and a target speed of the vehicle 1. The control device 70 performs vehicle travel control so that the vehicle 1 follows the target trajectory TTR. The control device 70 may perform autonomous driving control while performing optimization by model predictive control (MPC: Model Predictive Control).

2. Notification of Target Behavior of Vehicle

It is assumed that the vehicle 1 is under vehicle travel control (in particular, autonomous driving control) by the control device 70, and an occupant is on the vehicle 1. In such a situation, it may be desirable to notify the occupant of the target behavior of the vehicle 1 caused by the vehicle travel control in advance. As an example, consider a case where the vehicle control system 10 recognizes an obstacle that cannot be visually recognized by an occupant. For example, the vehicle control system 10 can acquire obstacle information via a camera mounted on the vehicle 1. Further, the vehicle control system 10 may acquire information of an obstacle captured by another camera by communication via the communication device 60. The vehicle control system 10 generates a target trajectory TTR to avoid obstacles, and causes the vehicle 1 to follow the target trajectory TTR. The behavior of the vehicle 1 indicated by the target trajectory TTR generated at this time is likely to differ from the behavior of the vehicle 1 up to the current point in time. In this case, since the occupant is unable to recognize the obstacle, there is a possibility that the vehicle 1 may feel uncomfortable or anxious by behaving differently from the previous tendency. In addition, there is a possibility that the occupant feels uncomfortable or anxious about a sudden vehicle behavior caused by the vehicle travel control, an unexpected vehicle behavior, a characteristic vehicle behavior, and the like. Therefore, the vehicle control system 10 notifies the occupant of the target behavior of the vehicle 1 caused by the vehicle travel control (in particular, autonomous driving control) via HMI unit 30 as needed. As a result, it is possible to expect an effect of reducing a sense of discomfort or anxiety that can be felt by the occupant. In the present embodiment, specific aspects thereof will be described below.

2-1. Overview of Notifications Indicating Target Behavior

Figure 3:
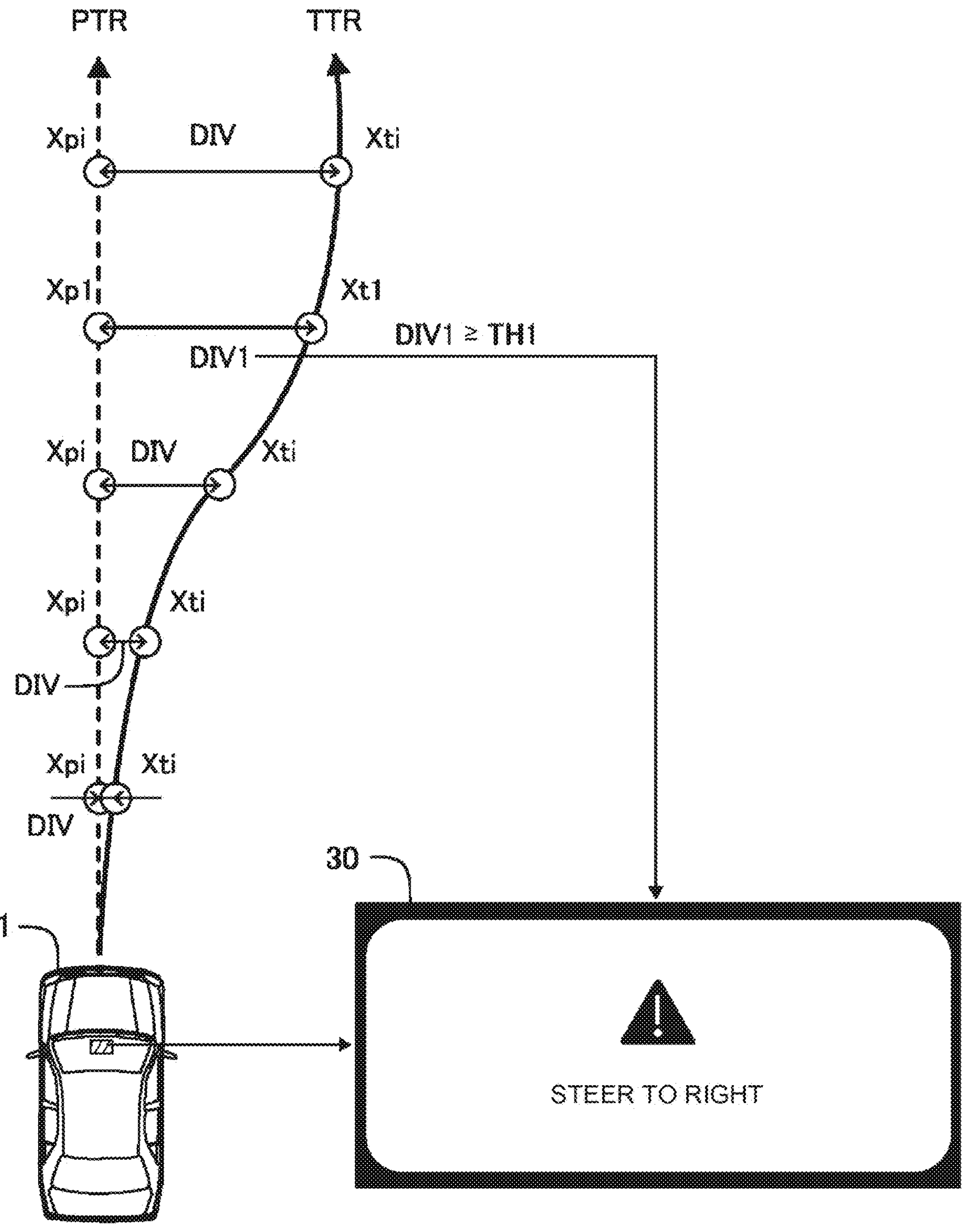
FIG. 3 is a schematic diagram illustrating a case in which a vehicle control system performs notification.

FIG. 3 is a schematic diagram illustrating a case in which the vehicle control system 10 performs notification. The predicted trajectory PTR is a hypothetical trajectory that the vehicle 1 travels based on the present condition of the vehicle 1. The predicted trajectory PTR includes a predicted position and a predicted velocity of the vehicle 1. The control device 70 can predict (calculate) the predicted trajectory PTR based on the vehicle motion model and the present vehicle state information 93 (vehicle speed, acceleration, yaw rate, steering angle, and the like). The predicted trajectory PTR in FIG. 3 shows the behavior of moving straight.

On the other hand, the target trajectory TTR in FIG. 3 is shifted rightward from the predicted trajectory PTR. In order for the vehicle 1 to follow the target trajectory TTR, FIG. 3 shows a situation in which a deviation occurs between the predicted trajectory PTR and the target behavior (target trajectory TTR) of the vehicle 1. As a specific scene in which the situation of FIG. 3 occurs, there is a case in which the vehicle control system 10 recognizes an obstacle that the occupant cannot visually recognize as described above. The control device 70 generates a target trajectory TTR to avoid the obstacle.

The control device 70 calculates a degree of deviation DIV between the target trajectory TTR and the predicted trajectory PTR. Simplified examples of the degree of deviation DIV include the distance between the target trajectory TTR and the predicted trajectory PTR. In the exemplary embodiment of FIG. 3, the control device 70 sets a time step and acquires position Xti at respective time steps on the target trajectory TTR. Similarly, the control device 70 acquires the position Xpi of the vehicle 1 in the respective time steps on the predicted trajectory PTR. The control device 70 calculates a degree of deviation DIV between the position Xti and the position Xpi.

Various other methods of calculating the degree of deviation DIV are conceivable. For example, differences in vehicular parameters (e.g., velocity, steering angle, etc.) between the target trajectory TTR and the predicted trajectory PTR may be calculated as a degree of deviation DIV. As yet another example, automated driving control may be performed while optimizing by model predictive control (MPC: Model Predictive Control). In this case, an error between the target value in MPC (the target vehicle state corresponding to the target trajectory TTR) and the predicted value (the predicted vehicle state predicted from the present vehicle state) may be used as the degree of deviation DIV.

Next, the control device 70 determines whether the degree of deviation DIV satisfies a particular criterion. If the degree of deviation DIV meets certain criteria, a notification indicating the target behavior is provided to the occupant via HMI unit 30. The condition under which the control device 70 provides a notification indicating the target behavior is referred to as a "notification providing condition". The notification providing condition may be, for example, a case where the degree of deviation DIV1 at a particular timing (first timing) is equal to or larger than a predetermined threshold TH1 as illustrated in FIG. 3. The degree of deviation DIV1 is a degree of deviation between the position Xt1 of the vehicle 1 on the target trajectory TTR and the position Xp1 of the vehicle 1 on the predicted trajectory PTR. The degree of deviation DIV considered as the notification providing condition need not be a degree of deviation at one timing. For example, the notification providing condition may be determined based on the mean value of the degree of deviation DIV of the plurality of timings or the integrated value of the degree of deviation DIV over the plurality of time steps. Other examples of the degree of deviation DIV and the notification providing condition will be described later.

The content of the target behavior notified via HMI unit 30 is preferably a content corresponding to an operation performed when the occupant drives the vehicle 1 such that the occupant can intuitively understand the content. In FIG. 3, HMI unit 30 displays a message indicating that the vehicle is to be steered rightward as the content corresponding to the steering operation. In addition, the notification may include a reason why the vehicle travel control that leads to such a target behavior is performed. Note that the notification indicating the target behavior may be provided by the sound of the speaker, or may be provided by using the visual display and the sound together.

Figure 4:
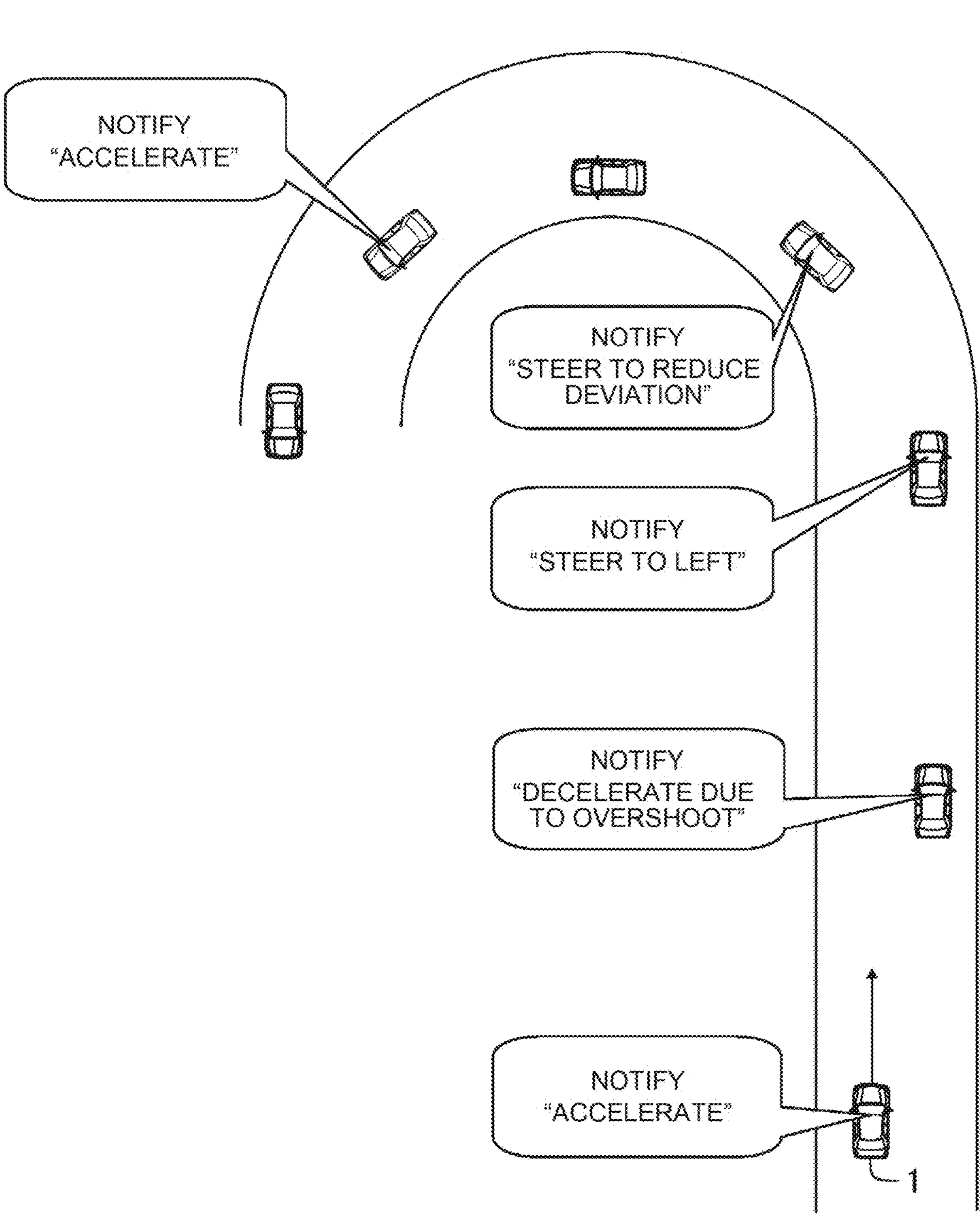
FIG. 4 is a diagram illustrating various examples of notifications.

FIG. 4 illustrates various examples of notifications. It shows how the vehicle 1 passes through the curve following the straight section. As illustrated, the vehicle control system 10 can also notify the target behavior of the vehicle 1 that cannot be predicted from the road shape alone. For example, acceleration in a straight section, acceleration/deceleration before and after a curve, and steering conforming to a curve shape are behaviors that can be assumed by an occupant from a road shape. For example, when the acceleration in the straight line section is large and the deceleration control is performed in order to safely pass through the following curve, it is possible that the deceleration timing of the vehicle 1 is earlier than expected by the occupant. As described above, the vehicle control system 10 can also notify the behavior of the vehicle 1 that cannot be assumed only from the road shape.

2-2. Effect

As described above, the vehicle control system 10 calculates a degree of deviation DIV between the target trajectory TTR and the predicted trajectory PTR or the predicted vehicle state. In addition, the vehicle control system 10 provides the occupant with a notification indicating the target behavior of the vehicle 1 caused by the vehicle travel control in accordance with the degree of deviation DIV. As a result, the occupant can know what kind of behavior the vehicle 1 performs from now on. Therefore, discomfort and anxiety with respect to a sudden vehicle behavior, an unexpected vehicle behavior, a specific vehicle behavior, and the like caused by the vehicle travel control are reduced.

Further, the notification providing condition can be changed by the occupant, so that a notification suitable for the occupant himself/herself can be displayed (details will be described later). As a result, it is possible to prevent a situation in which "notification is not made in a situation in which an occupant desires notification" or "unnecessary notification is made in a situation in which an occupant does not need notification". This contributes to reducing the anxiety of the occupant and preventing unnecessary notification.

3. Examples of Degree of Deviation and Notification Providing Conditions

In FIG. 3, the notification providing condition is based on a degree of deviation DIV between the position of the target trajectory TTR and the predicted trajectory PTR. However, the notification providing condition and the degree of deviation DIV are not limited to such cases.

The degree of deviation DIV may be calculated based on a difference between the "target vehicle parameter TPA" and the "predicted vehicle parameter PPA". The target vehicle parameter TPA defines a target vehicle state. The target vehicle state refers to the state of the vehicle 1 at every time step on the target trajectory TTR. That is, the target vehicle parameter TPA indicates a vehicle state required for the vehicle 1 to travel following the target trajectory TTR. Similarly, the predicted vehicle parameter PPA defines a predicted vehicle state. That is, the predicted vehicle parameter PPA indicates a vehicle state when the vehicle 1 is assumed to travel along the predicted trajectory PTR. Examples of the parameters (target vehicle parameter TPA, predicted vehicle parameter PPA) include a position, a vehicle speed, an acceleration, a yaw rate, a steering angle, an actuator control amount, an actuator operation amount, and the like.

Here, the control device 70 calculates the degree of deviation DIV based on the difference between the target vehicle parameter TPA and the predicted vehicle parameter PPA. The degree of deviation DIV is an index in which parameters are included in a complex manner. The degree of deviation DIV is calculated based on a difference between the target vehicle parameter TPA and the predicted vehicle parameter PPA at a future first timing. Typically, when the degree of deviation DIV at the future first timing is equal to or larger than the predetermined value, the control device determines that the notification providing condition is satisfied.

In addition, a machine learning model using the degree of deviation DIV as the input data may determine the notification providing condition and the content of the notification. As described above, the calculation of the degree of deviation DIV is a complex index in which various parameters are related. Therefore, it may be appropriate to generate a notification providing condition in which each parameter is taken into consideration in a composite manner by using a machine learning model rather than based on a preset threshold. The content of the notification may also be a content that is taken into consideration in a complex manner by the machine learning model. That is, by using the machine learning model in combination, the notification providing condition and the content of the notification can be determined more flexibly.

In addition, the notification providing condition may be settable by the occupant. For example, the level of the threshold of the degree of deviation DIV defining the notification providing condition may be adjustable by the occupant. Also, differences between the target vehicle parameter TPA and the predicted vehicle parameter PPA may be considered only for certain parameters selected by the occupant. In this case, the degree of deviation DIV is calculated only for the parameter selected by the occupant, and is considered in the determination of the notification providing condition. Through such a setting, the occupant can appropriately adjust the frequency and content of the notification for himself/herself.

4. Configuration Example

Figure 5:
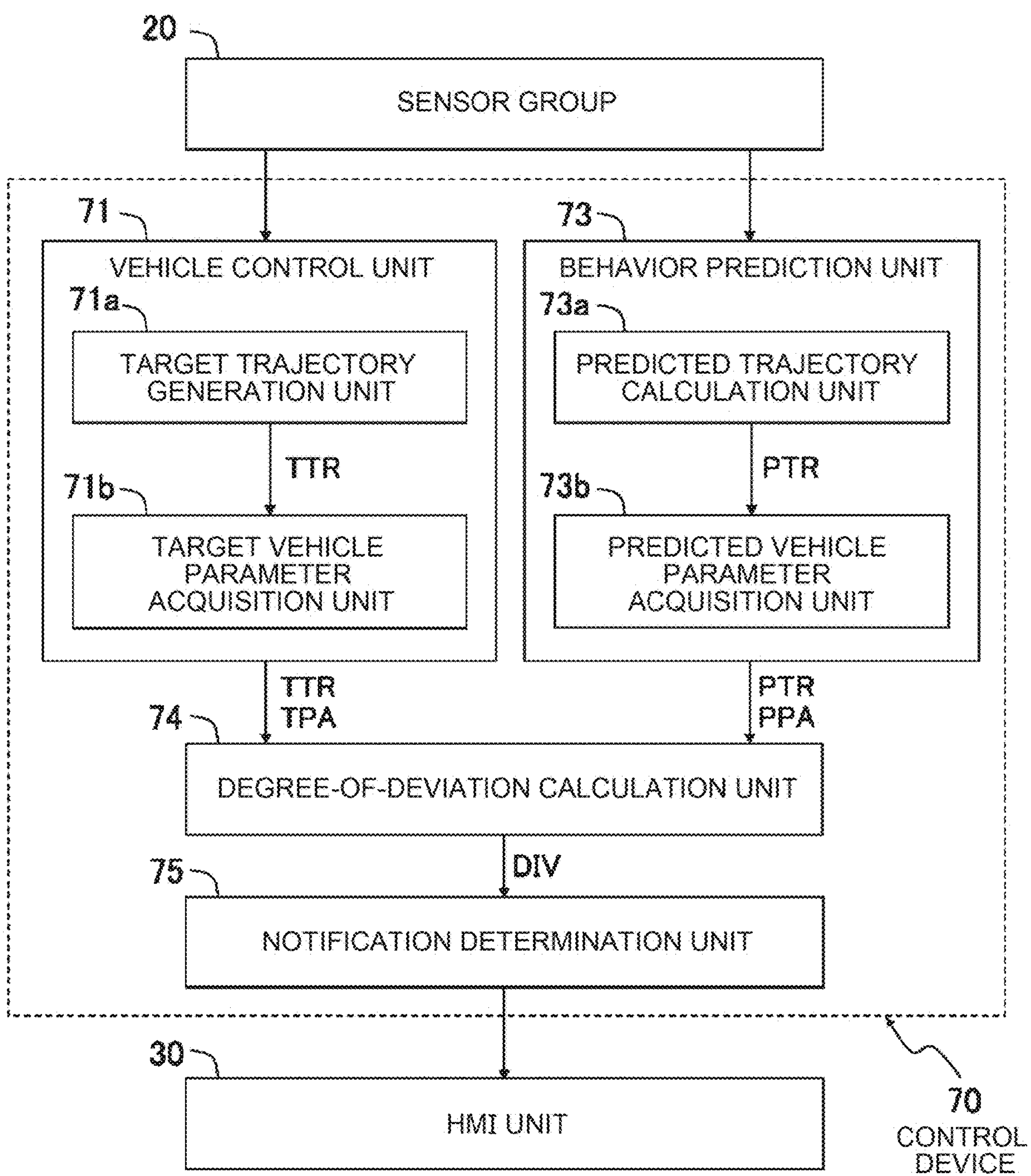
FIG. 5 is a block diagram illustrating a detailed configuration of the vehicle control system.

FIG. 5 is a block diagram illustrating a detailed configuration example of the vehicle control system 10.

The vehicle control unit 71 acquires the driving environment information 90 from the sensor group 20. The target trajectory generation unit 71*a* generates a target trajectory TTR based on the driving environment information 90. The target vehicle parameter acquiring unit 71*b* acquires the target vehicle parameter TPA based on the generated target trajectory TTR.

The behavior prediction unit 73 acquires various kinds of information including the vehicle state information 93 from the sensor group 20. The predicted trajectory calculation unit 73*a* calculates a predicted trajectory PTR based on various types of information and the vehicle motion model from the sensor group 20. The vehicle motion model is stored in advance in the storage device 72. The predicted vehicle parameter acquiring unit 73*b* acquires the predicted vehicle parameter PPA based on the generated predicted trajectory PTR.

The degree-of-deviation calculation unit 74 receives information from the vehicle control unit 71 and the behavior prediction unit 73. The degree-of-deviation calculation unit 74 performs "trajectory comparison" in which the target trajectory TTR is compared with the predicted trajectory PTR. Further, the degree-of-deviation calculation unit 74 may perform "parameter comparison" for comparing the target vehicle parameter TPA with the predicted vehicle parameter PPA. The degree-of-deviation calculation unit 74 calculates a degree of deviation DIV by trajectory comparison or parameter comparison.

The notification determination unit 75 receives information regarding the degree of deviation DIV from the degree-of-deviation calculation unit 74. The notification determination unit 75 determines whether the notification providing condition is satisfied based on the degree of deviation DIV. Examples of notification providing conditions are as described in Sections 2 and 3. When the notification providing condition is satisfied, the notification determination unit 75 provides a notification indicating the target behavior of the vehicle 1 to the occupant via HMI unit 30.

Figure 6:
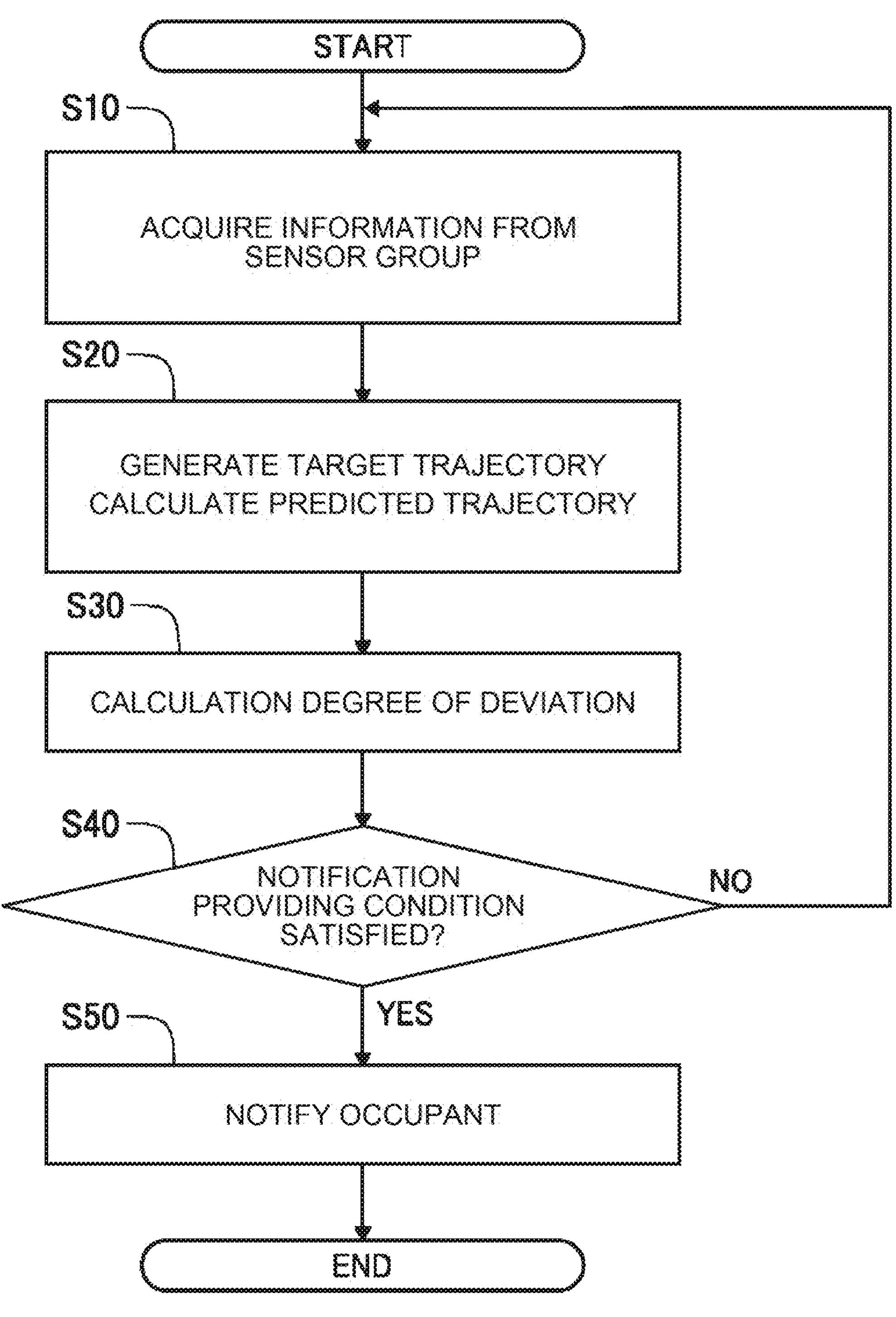
FIG. 6 is a flowchart summarizing a process of notifying a target behavior.

FIG. 6 is a flowchart summarizing a process of notifying a target behavior.

In S10, the control device 70 acquires various types of information including the driving environment information 90 and the vehicle state information 93 from the sensor group 20. Thereafter, the process proceeds to S20.

In S20, the control device 70 generates a target trajectory TTR and calculates a predicted trajectory PTR based on various pieces of data acquired from the sensor group 20. Further, the target vehicle parameter TPA and the predicted vehicle parameter PPA are acquired based on the target trajectory TTR and the predicted trajectory PTR. Thereafter, the process proceeds to S30.

In S30, the control device 70 performs trajectory comparison and parameter comparison. Further, the degree of deviation DIV is calculated based on the trajectory comparison and the parameter comparison. Thereafter, the process proceeds to S40.

In S40, the control device 70 determines whether the notification providing condition is satisfied. When the notification providing condition is satisfied (S40; YES), the process proceeds to S50. On the other hand, if the notification providing condition is not satisfied (S40; NO), the process returns to S10.

In S50, the control device 70 provides the occupant with a notification indicating the scheduled behavior of the vehicle 1. The notification is provided via HMI unit 30 in the vehicle 1. After that, the process ends.

What is claimed is:

1. A vehicle control system that controls a vehicle, the vehicle control system comprising a control device, wherein the control device is configured to perform vehicle travel control for generating a target trajectory based on a driving environment of the vehicle and controlling the vehicle in such a manner that the vehicle follows the target trajectory, calculate a degree of deviation between a predicted trajectory or a predicted vehicle state and the target trajectory, the predicted trajectory or the predicted vehicle state being predicted from a current vehicle state of the vehicle, and when the degree of deviation satisfies a notification providing condition, provide a notification indicating a target behavior of the vehicle due to the vehicle travel control to an occupant of the vehicle, and the control device is further configured to acquire a target vehicle parameter that is necessary for the vehicle to follow the target trajectory, acquire a predicted vehicle parameter predicted when the vehicle is assumed to travel along the predicted trajectory, and calculate the degree of deviation based on a difference between the target vehicle parameter and the predicted vehicle parameter at a future first timing.

2. The vehicle control system according to claim 1, wherein the notification providing condition includes a case where the degree of deviation is equal to or larger than a predetermined threshold.

3. The vehicle control system according to claim 1, wherein the control device is configured to determine the notification providing condition and a content of the notification by using a machine learning model.

4. The vehicle control system according to claim 1, wherein the notification providing condition is allowed to be set by the occupant.

* * * * *